US 010312845B2

(12) United States Patent
Pietromonaco

(10) Patent No.: US 10,312,845 B2
(45) Date of Patent: Jun. 4, 2019

(54) METHOD AND APPARATUS FOR OPERATING AN ELECTRIC MOTOR

(71) Applicant: ARM Ltd., Cambridge (GB)

(72) Inventor: David Victor Pietromonaco, Cupertino, CA (US)

(73) Assignee: ARM Ltd., Cambridge (GB)

( * ) Notice: Subject to any disclaimer, the term of this patent is extended or adjusted under 35 U.S.C. 154(b) by 0 days.

(21) Appl. No.: 15/182,474

(22) Filed: Jun. 14, 2016

(65) Prior Publication Data

US 2017/0359013 A1   Dec. 14, 2017

(51) Int. Cl.
| | |
|---|---|
| *H02P 27/08* | (2006.01) |
| *H02P 25/086* | (2016.01) |
| *H02P 25/08* | (2016.01) |
| *H02K 19/10* | (2006.01) |

(52) U.S. Cl.
CPC ......... *H02P 25/086* (2013.01); *H02K 19/103* (2013.01); *H02P 25/08* (2013.01); *H02P 27/08* (2013.01)

(58) Field of Classification Search
CPC ...... H02P 21/06; H02P 23/08; H02P 2207/01; H02P 21/085; H02P 27/08
USPC ................ 318/727, 798, 800, 801, 811, 599
See application file for complete search history.

(56) References Cited

U.S. PATENT DOCUMENTS

| | | | | |
|---|---|---|---|---|
| 5,111,095 A | * | 5/1992 | Hendershot | H02K 19/103 174/DIG. 19 |
| 5,652,493 A | * | 7/1997 | Hendershot, Jr. | H02K 19/103 318/400.17 |
| 5,838,087 A | | 11/1998 | Tang | |
| 5,973,431 A | * | 10/1999 | Li | H02P 25/092 310/156.15 |
| 6,060,809 A | | 5/2000 | Pengov | |
| 6,608,396 B2 | * | 8/2003 | Downer | B60L 11/123 290/40 C |

(Continued)

FOREIGN PATENT DOCUMENTS

| | | |
|---|---|---|
| EP | 0892490 A1 | 1/1999 |
| GB | 2262843 A | 6/1993 |

(Continued)

OTHER PUBLICATIONS

Notification of Transmittal of the International Search Report and the Written Opinion of the International Searching Authority, or the Declaration, International Application No. PCT/GB2017/051684, dated Aug. 24, 2017 1 pg.

(Continued)

*Primary Examiner* — Rina I Duda
(74) *Attorney, Agent, or Firm* — Berkeley Law & Technology Group, LLP

(57) ABSTRACT

Apparatus and methods are provided for operating an electric motor, comprising selectively energizing the coils of a stator having a plurality of stator teeth, each stator tooth having a said coil mounted thereon. The stator coils of a subset of the stator teeth are energized during a given time period to attract a corresponding rotor tooth into alignment with each of the stator teeth in the subset over the given time period. The stator coil of at least one stator tooth in the subset is energized during a portion of the given time period before the at least one stator tooth overlaps the corresponding rotor tooth.

18 Claims, 7 Drawing Sheets

(56) References Cited

U.S. PATENT DOCUMENTS

| | | | |
|---|---|---|---|
| 6,897,591 B2* | 5/2005 | Peachee | H02K 1/148 310/166 |
| 8,450,954 B2 | 5/2013 | Pietromonaco | |
| 9,130,433 B2 | 9/2015 | Pietromonaco | |
| 9,214,837 B2 | 12/2015 | Pietromonaco | |
| 2004/0062059 A1* | 4/2004 | Cheng | B60L 11/1814 363/17 |
| 2006/0087191 A1 | 4/2006 | Norell et al. | |
| 2011/0050151 A1* | 3/2011 | El-Antably | H02P 29/50 318/717 |
| 2012/0194040 A1* | 8/2012 | Hao | H02K 3/28 310/68 D |
| 2012/0319639 A1* | 12/2012 | Ishikawa | H02P 25/0925 318/689 |
| 2015/0326100 A1 | 11/2015 | Pietromonaco | |
| 2016/0043681 A1* | 2/2016 | Deguchi | H02P 25/092 318/254.2 |
| 2016/0065041 A1 | 3/2016 | Pietromonaco | |
| 2016/0079889 A1 | 3/2016 | Pietromonaco | |
| 2016/0079893 A1 | 3/2016 | Pietromonaco | |

FOREIGN PATENT DOCUMENTS

| | | |
|---|---|---|
| WO | 2016-042292 A1 | 3/2016 |
| WO | 2016042293 A1 | 3/2016 |

OTHER PUBLICATIONS

International Search Report, International Application No. PCT/GB2017/051684, dated Aug. 24, 2017, 5 pgs.

The Written Opinion of the International Searching Authority, International Application No. PCT/GB2017/051684, dated Aug. 24, 2017, 8 pgs.

* cited by examiner

METHOD AND APPARATUS FOR OPERATING AN ELECTRIC MOTOR

TECHNICAL FIELD

The present disclosure relates to the electrical motors. In particular, this disclosure relates to methods and apparatus for controlling an electric motor

BACKGROUND

Switched reluctance electric motor systems are known which have certain undesirable characteristics, such a loud noise profiles or large peak supply current requirements. The present disclosure attempts to provide techniques for an improved electric motor system.

SUMMARY

In a first aspect, an electric motor comprising:
a stator comprising a plurality of stator teeth, each stator tooth having a stator coil mounted thereto;
a rotor comprising a plurality of rotor teeth, the rotor being arranged to rotate relative to said stator during operation of the electric motor such that one or more of the rotor teeth periodically overlap with one or more of the stator teeth; and
control circuitry to energise the stator coils of a subset of the stator teeth during a given time period to attract a rotor tooth into alignment with each of the stator teeth in the subset over the given time period,
wherein, the control circuitry is configured to energise the stator coil of at least one stator tooth in the subset during a portion of the given time period before the at least one stator tooth overlaps the corresponding rotor tooth.

In a second aspect, circuitry for an electric motor comprising:
driver circuitry to selectively energise the stator coils of a stator having a plurality of stator teeth, each stator tooth having a said stator coil mounted thereon; and
control circuitry to cause the driver circuitry to energise the stator coils of a subset of the stator teeth during a given time period to attract a corresponding rotor tooth into alignment with each of the stator teeth in the subset over the given time period,
wherein the control circuitry is configured to cause the driver circuitry to energise the stator coil of at least one stator tooth in the subset during a portion of the given time period before the at least one stator tooth overlaps the corresponding rotor tooth.

In a third aspect, a method of operating an electric motor, comprising:
selectively energising the coils of a stator having a plurality of stator teeth, each stator tooth having a said coil mounted thereon, the selective energising comprising:
energising the stator coils of a subset of the stator teeth during a given time period to attract a corresponding rotor tooth into alignment with each of the stator teeth in the subset over the given time period,
wherein the stator coil of at least one stator tooth in the subset is energised during a portion of the given time period before the at least one stator tooth overlaps the corresponding rotor tooth.

BRIEF DESCRIPTION OF THE DRAWINGS

The present invention is further described, by way of example only, with reference to embodiments as illustrated in the accompanying drawings, in which.

DETAILED DESCRIPTION

Figure 1:
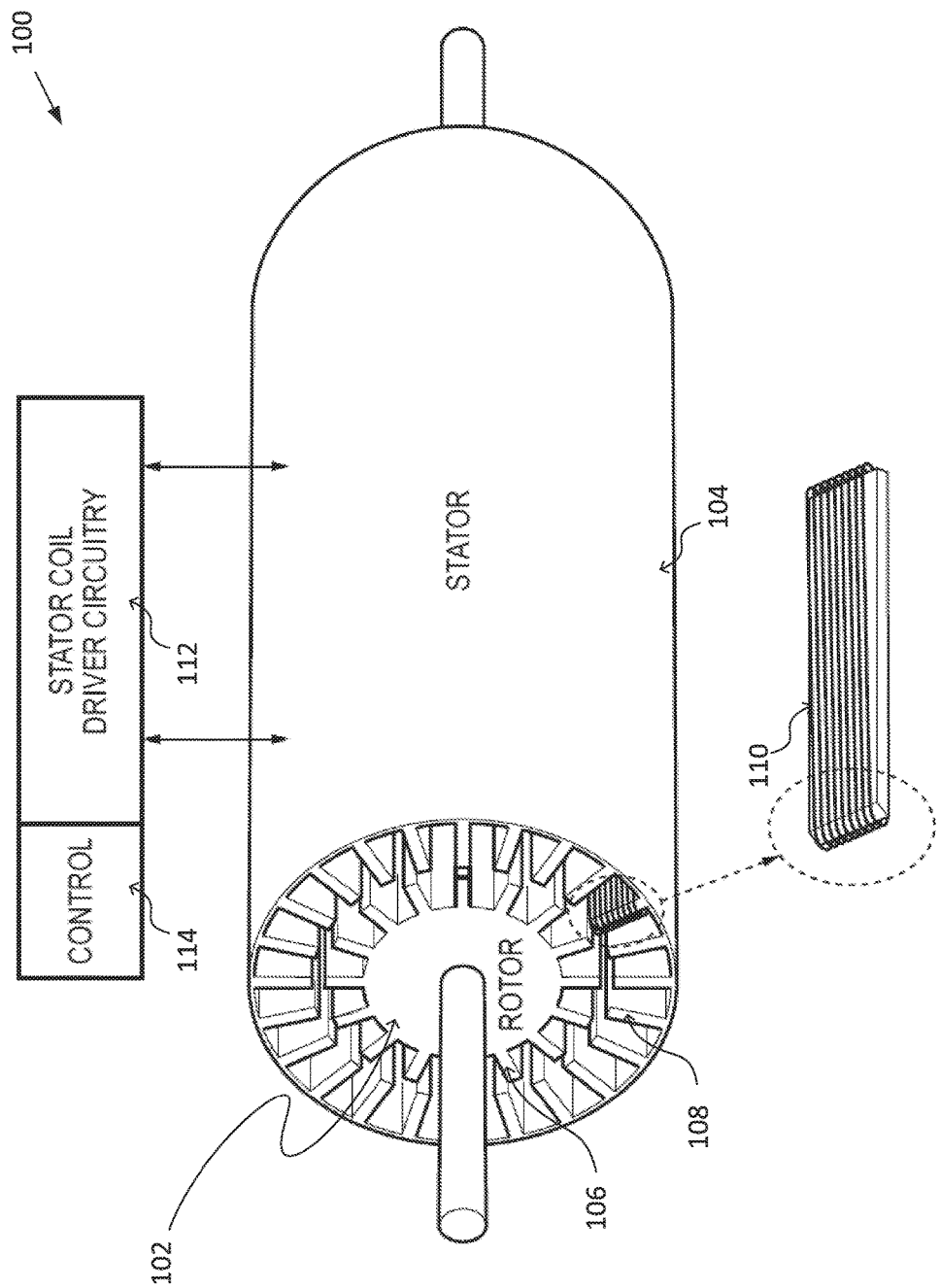
FIG. 1 illustrates a switched reluctance electrical motor system in accordance with embodiments.

FIG. 1 illustrates a switched reluctance electrical motor system 100 in accordance with embodiments. The electrical motor comprises a rotor 102 and a stator 104. The rotor 102 is arranged to rotate relative to the stator 104. The rotor 102 comprises a plurality of rotor teeth 106. The rotor teeth 106 comprise protrusions extending radially outward from the rotor 102. In the embodiments depicted in FIG. 1, each rotor tooth 106 extends along the length of the rotor 102. In the embodiments depicted in FIG. 1, the rotor 102 has 16 rotor teeth 106. In alternative embodiments, the stator may have greater or fewer than 16 rotor teeth.

The stator 104 comprises a plurality of stator teeth 108. The stator teeth 108 comprise protrusions extending radially inwards from the stator 104. In the embodiments depicted in FIG. 1, each stator tooth extends along the length of the stator 104. In the embodiments depicted in FIG. 1, the stator 104 has 24 rotor teeth 108. In alternative embodiments, the stator may have greater or fewer than 24 stator teeth. Each stator tooth is configured to have a stator coil 110 mounted thereto. For example, each stator coil 110 may be wound around the respective stator tooth 108. Each stator coil may typically comprise a high number of turns, for example 200.

In the embodiments depicted in FIG. 1, only a single stator tooth is shown with a mounted stator coil 110 for clarity. However, in practice many, or all, of the stator teeth may have such stator coils mounted thereto. In the embodiments depicted in FIG. 1, no coils are shown mounted to the rotor teeth 106. In alternative embodiments (not shown), rotor coils may be mounted to each of the rotor teeth 106 in a similar manner.

The electrical motor system 100 further comprises driver circuitry 112 to energise the respective stator coils 110, and control circuitry 114 to control the driver circuitry 112 and thereby control the power supplied to the stator coils 110. In some embodiments, control circuitry 114 may be considered to comprise the driver circuitry 112.

Figure 2:
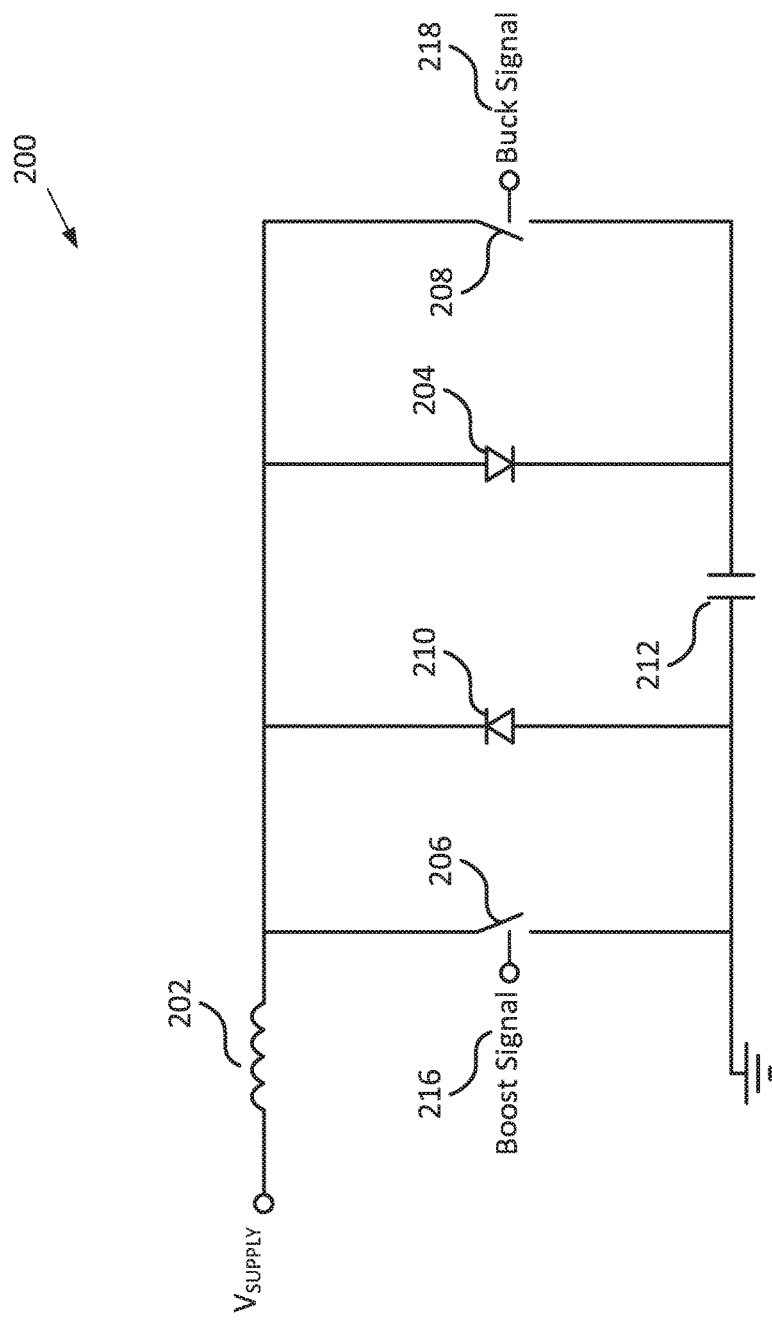
FIG. 2 schematically illustrates an example portion of the driver circuitry according to embodiments.

FIG. 2 schematically illustrates an example portion 200 of the driver circuitry 112 for supplying power to a given stator coil 110 according to embodiments. The given stator coil is schematically represented in FIG. 2 as an inductance 202. The driver circuitry 200 can be viewed as a hybrid switched-inductance voltage converter comprising a voltage boost portion and a voltage buck portion. The voltage boost portion of the driver circuitry 200 comprises a boost diode 204 and a boost switch 206. The voltage buck portion of the driver circuitry 200 comprises a buck switch 208 and a buck diode 210. The voltage boost portion and voltage buck portion of the driver circuitry 200 both utilise storage capacitor 212.

The boost switch 206 and the buck switch 208 are electronically controllable by the control circuitry 114, via a boost control signal 216 and a buck control signal 218 respectively. In embodiments, the boost switch 206 and the buck switch 208 may each comprise transistor based switching elements. In operation, the boost control signal 216 and the buck control signal 218 are asserted in mutual exclusion to cause the stator coil 202 to be powered in a bi-polar fashion, wherein current is first caused to flow through the stator coil in one direction (i.e. during boost operation), and then to flow through the stator coil in the opposite direction (i.e. during buck operation).

During boost operation, the voltage boost portion of the driver circuitry 200 is used. When the boost control signal 216 is asserted, the boost switch 206 is caused to conduct (i.e. close), and the supply voltage is applied across the stator coil, represented by inductance 202. This causes current to flow from the supply through the stator coil, thereby generating a magnetic field at the stator coil. When the boost control signal 216 is switched off (i.e. not asserted), the boost switch 206 ceases to conduct (i.e. opens). However, current will continue to flow through the stator coil for a period due to the inductance 202 of the stator coil. The current that flows through the stator coil during this period flows via boost diode 204 into storage capacitor 212. Hence, the energy dissipated from the stator coil during this period is collected by storage capacitor 212. This boosts the storage capacitor 212 to a voltage level which shuts down the current in the stator coil. The charge stored in the storage capacitor 212 is thereafter available for energising the stator coil in the opposite direction during buck operation of the driver circuit 200.

During buck operation, the voltage buck portion of the driver circuitry 200 is used. When the buck control signal 218 is asserted, the buck switch 208 is caused to conduct (i.e. close), and the voltage of the storage capacitor 212 is applied to the stator coil. This causes current to flow from the storage capacitor 212, through the stator coil in the opposite direction, thereby generating a magnetic field at the stator coil of the opposite polarity. When the buck control signal 218 is switched off (i.e. not asserted), the buck switch 208 ceases to conduct (i.e. opens). Again, current will continue to flow through the stator coil for a period due to the inductance 202 of the stator coil. The current that flows through the stator coil during this period flows via buck diode 210 into the supply.

Figure 3:
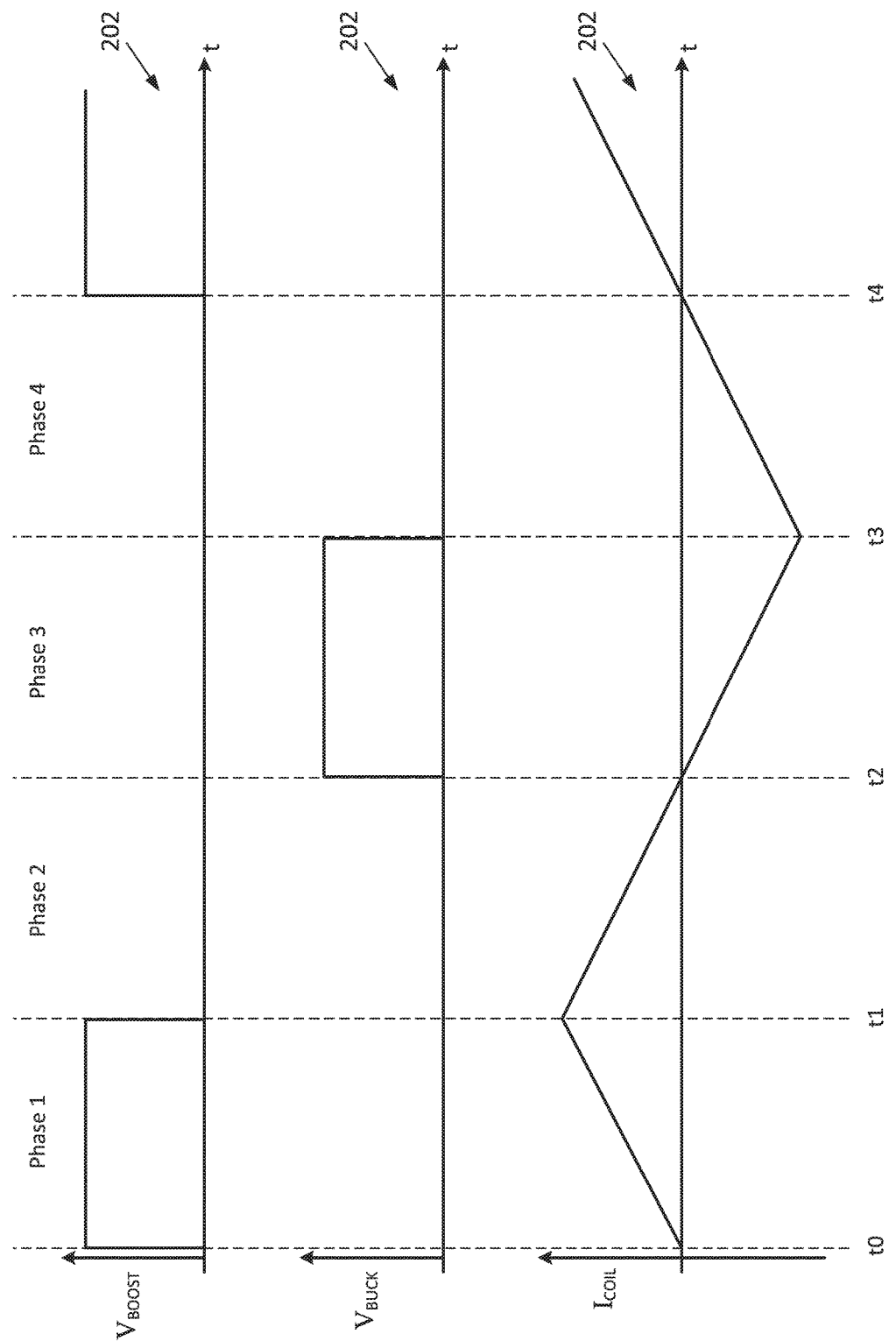
FIG. 3 illustrates an example operation of the driver circuitry portion according to embodiments.

FIG. 3 illustrates an example operation of the driver circuitry portion 200 and the resulting current generated through the respective stator coil 110. Graph 300 shows the voltage of boost control signal 216 over time (labelled $V_{BOOST}$). Graph 302 shows the voltage of buck control signal 218 over time (labelled $V_{BUCK}$). Graph 304 shows the resulting current generated in the corresponding stator coil 110 over the same time period (labelled $I_{COIL}$). As previously mentioned, the boost control signal 216 and the buck control signal 218 are asserted in mutual exclusion by the control circuitry 114. In embodiments, the control circuitry 114 is configured to assert the boost control signal 216 and the buck control signal 218, only when the current in the stator coil has returned to zero (or close to zero). In this manner, the voltages in the driver circuit portion 200 are switched only when the current is low, and the currents in the stator coil are switched only when the voltages are low. This has the effect of ensuring that the power dissipation requirements of the boost switch 206 and buck switch 208 are small, which means that relatively low cost switching elements (e.g. MOSFETs) can be used (instead of more expensive high-power IGBTs for example).

The operation of the driver circuitry during this time period can be conceptually divided into four phases, as shown in FIG. 3. During Phase 1, the boost control signal 216 is asserted, causing current to flow through the stator coil in a first direction (shown as a positive current on graph 304). During Phase 2, the boost control signal 216 is removed. However, due to the inductance of the stator coil, current continues to flow through the coil in the first direction for a period of time, charging the storage capacitor 212. During Phase 3, the buck control signal 218 is asserted, causing current to flow through the stator coil in the second (opposite) direction (shown as a negative current on graph 304), discharging storage capacitor 212. During Phase 4, the buck control signal 218 is removed. However, due to the inductance of the stator coil, current continues to flow through the coil in the second direction for a period of time, into the supply.

As described in FIG. 1, the stator 104 of the electric motor system 100 comprises a plurality of stator teeth 108, each stator tooth 108 having a stator coil 110 mounted thereto. In embodiments, the driver circuitry 112 of the electric motor system 100 comprises a plurality of driver circuit portions 200, each arranged to drive a different one of the stator coils 110, or subset of the stator coils 110.

Figure 4:
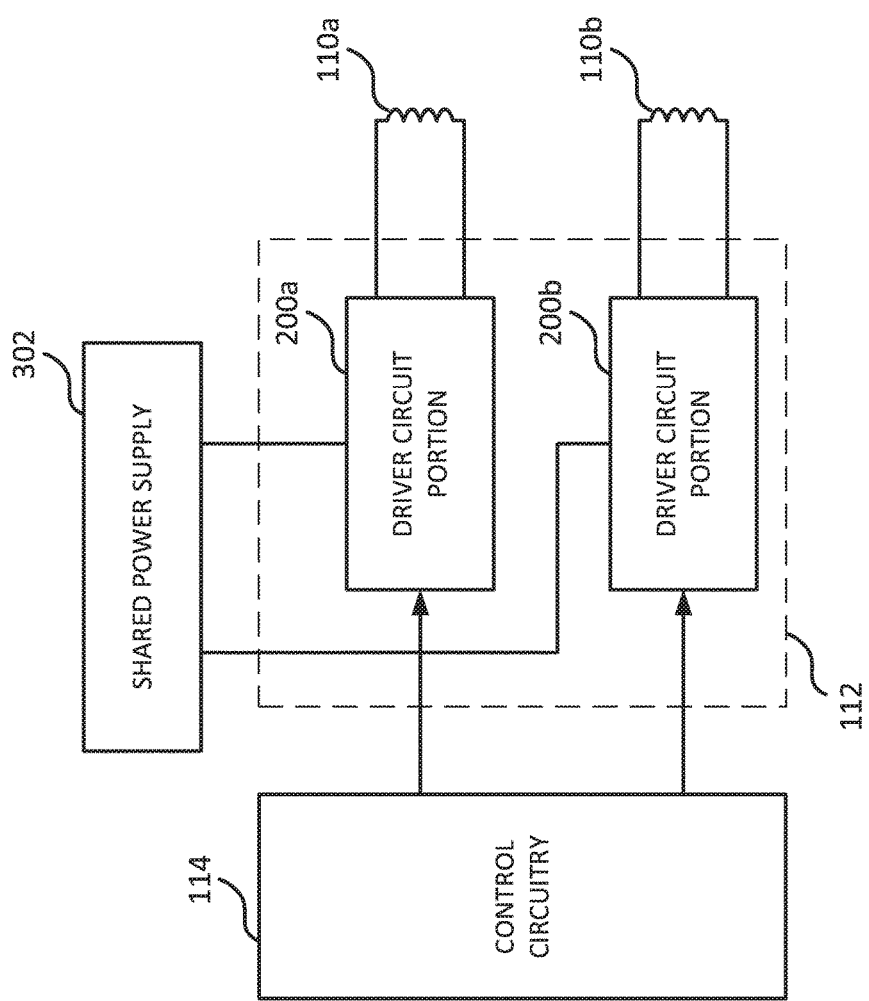
FIG. 4 illustrates an example arrangement, in which two driver circuit portions are arranged in a pair, according to embodiments.

FIG. 4 illustrates an example arrangement, in which two driver circuit portions 200a, 200b are arranged in a pair with a shared power supply 302, to driver stator coils 110a and 110b respectively. By arranging the driver circuit portions 200a, 200b in such a pair, the control circuitry 114 can be configured to schedule the boost control signals 216 and buck control signals 218 supplied to each driver circuit 200 such that the power drawn from the shared supply 302 by one of the driver circuit portions 200a, 200b is offset by the power returned to the supply by the other driver circuit portion 200a, 200b in the pair. For example, the control circuitry 114 may assert the boost control signal for one driver circuit portion 200a, 200b in the pair, while simultaneously asserting the buck control signal for the other driver circuit portion 200a, 200b in the pair. In this manner, the net power drawn by the two driver circuits from the supply during operation is significantly reduced.

For example, when driver circuit portion 200a is in boost operation, current is caused to flow from the shared supply 302 into stator coil 100a, and ultimately charge the storage capacitor of driver circuit portion 200a. At the same time, driver circuit portion 200b is in buck operation; current is discharged from the storage capacitor of driver circuit portion 100b and caused to flow in the opposite direction back into the shared supply 302 via stator coil 100b. Similarly, when driver circuit portion 200b is in boost operation, current is caused to flow from the shared supply 302 into stator coil 100, and ultimately charge the storage capacitor of driver circuit portion 200b. At the same time, driver circuit portion 200a is in buck operation; current is discharged from the storage capacitor of driver circuit portion 100a and caused to flow in the opposite direction back into the shared supply 302 via stator coil 100a. The net effect of this balanced operation of the pair of driver circuit portions 200a, 200b is a significantly reduced supply current load on shared power supply 302.

Figure 5:
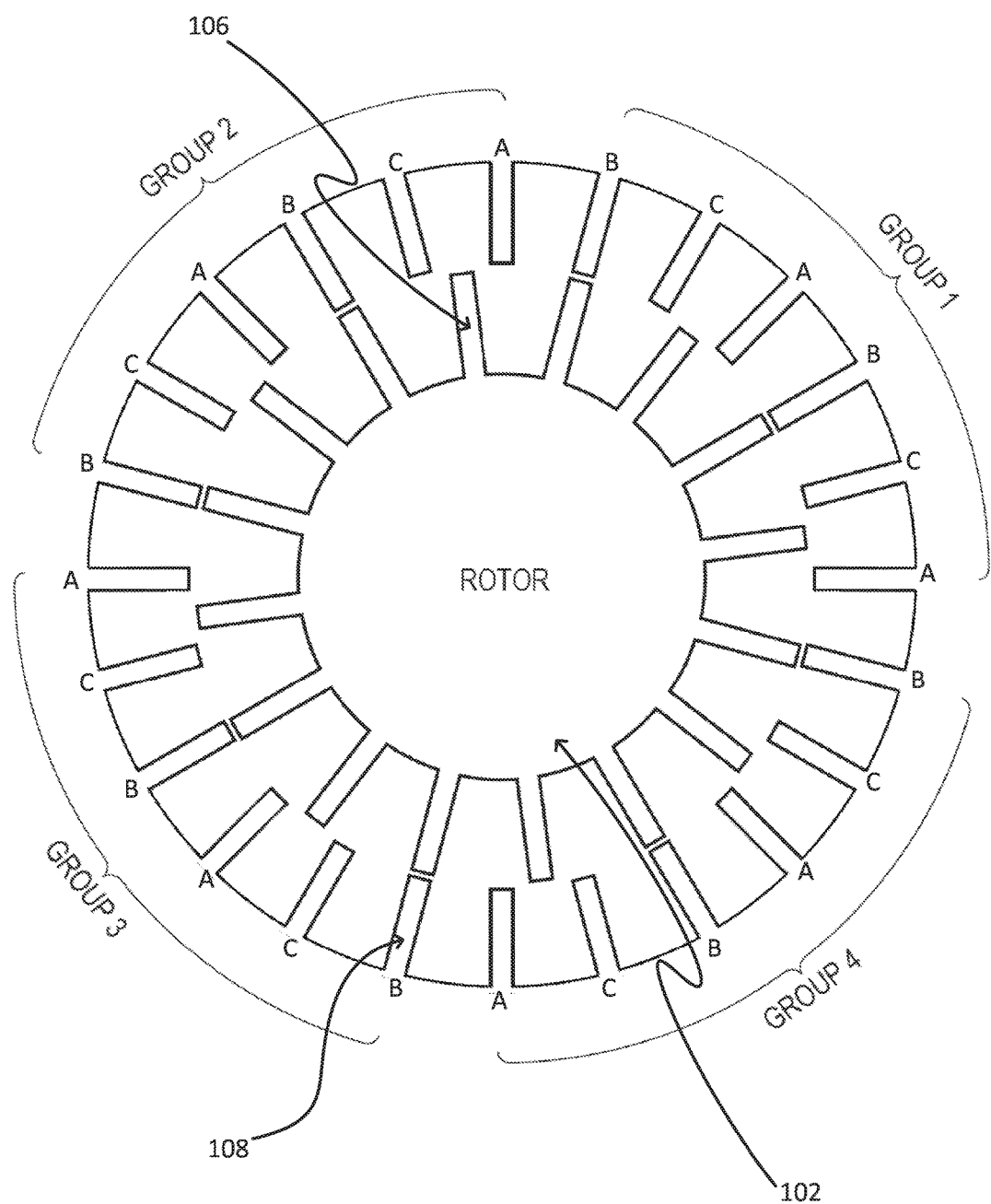
FIG. 5 illustrates a radial view of the rotor and stator, according to embodiments.

FIG. 5 illustrates a radial view of the rotor 102 and stator 104 of the exemplary electrical motor system 100. As a result of the ratio of the number of rotor teeth 106 to the number of stator teeth 108, in this example 2:3, it can be seen that every third stator tooth may be simultaneously aligned with a rotor tooth, while every second rotor tooth is in alignment with a stator tooth. In order to induce motion in the rotor 102, the various stator coils 110 mounted on the stator teeth 108 of the electric motor are energised in sequence to attract an adjacent or nearby rotor tooth 106 towards the position of that stator tooth.

Due to the rotational symmetry of the example electric motor system 100 depicted in FIG. 5, it can be seen that every third stator tooth 108 is in the same position relative to its nearest rotor tooth 106. In other words, every stator tooth 108 labelled "A" in FIG. 3 is in the same position relative to its nearest rotor tooth 106. Similarly, every stator tooth 108 labelled "B" is in the same position relative to its nearest rotor tooth 106, and every stator tooth 108 labelled "C" is in the same position relative to its nearest rotor tooth 106. Hence, it can be seen that the stator coil 110 of every third stator tooth 108 should be energised at approximately the same time during normal operation of the electric motor system 100 in order to encourage rotation of the rotor 102.

In order to provide the aforementioned pairing arrangement, pairs of stator coils 110 are selected which are mounted on stator teeth 108 that are a multiple of three teeth apart (i.e. they are labelled with the same letter in FIG. 5). For electric motor systems in which the ratio of the number of rotor teeth 106 to the number of stator teeth 108 is other than 2:3, different teeth selection arrangements are required. Pairs of stator coils 110 may be selected such that the stator teeth 108 are nearby, for example. Alternatively, pairs of stator coils 110 may be selected in which the stator teeth 108 are opposite, or in some other arrangement.

Further, groups of stator coils 110 may be arranged which contain pairs of stator coils mounted to stator teeth 108 of each relative location (i.e. a pair labelled "A", a pair labelled "B" and a pair labelled "C"). For example, in FIG. 5, four groups of stator coils 110 have been arranged (labelled Group 1-4), where each group contains a pair of stator coils corresponding to stator teeth 108 of each relative location. The stator coils in each group may be controlled control circuitry and/or driver circuitry that is provided on a shared circuit board and or use a shared power supply. Using this arrangement, the current drawn by each group can be balanced efficiently. This arrangement also allows the control sequence for each group to be repeated across the other groups. In the embodiments depicted in FIG. 5, Groups 1-4 comprise stator coils 110 mounted to adjacent stator teeth 108. In alternative embodiments, different selections of stator coils may be used. Possible alternative selections include the aforementioned arrangement in which pairs of stator coils are mounted to stator teeth located opposite to each other on stator 104, or selecting groups in which the stator coils 110 in each group are more evenly distributed around stator 104.

Figure 6C:
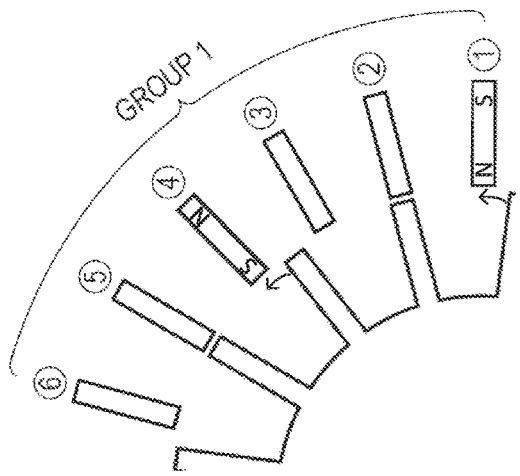
FIGS. 6a, 6b and 6c illustrate a close up radial view of a group of stator teeth and the adjacent rotor teeth during operation of the exemplary electrical motor system.
Figure 6B:
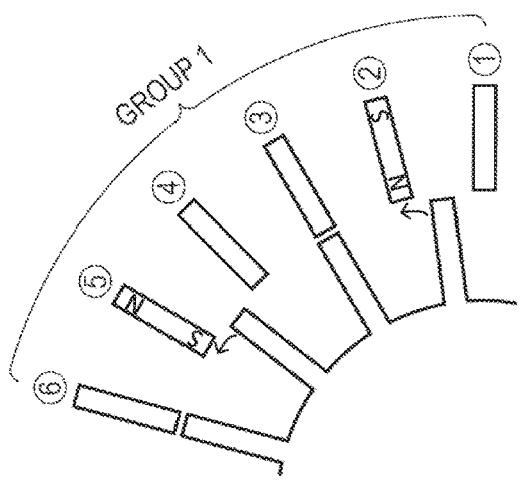
Figure 6A:
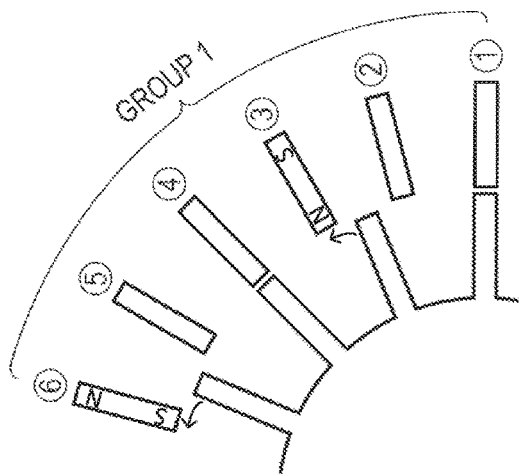

FIGS. 6a, 6b and 6c illustrate a close up radial view of the stator teeth 108 in Group 1 and the adjacent rotor teeth 106 during operation of the exemplary electrical motor system 100. The six stator teeth 108 of Group 1 have been labelled with the numerals 1-6 for ease of reference in the following description. In order to cause rotation of the rotor 102, the timing of the boost and buck operations of the various stator coils 110 mounted on the stator teeth 108 of the electric motor are offset with respect to one another, as described further below.

In the initial position depicted in FIG. 6a, rotor teeth 106 are in alignment with the stator teeth in Group 1 labelled 1 and 4. In order to induce anticlockwise rotation of the rotor, the pair of stator coils 110 mounted to the stator teeth 108 labelled 3 and 6 are energised by control circuitry 112 and corresponding driver circuitry 114. This sets up magnetic fields in the respective stator coils 110, as illustrated in FIG. 6a. The magnetic field induced in the stator tooth labelled 3 is oriented with north (N) radially inwards, whereas the magnetic field induced in the stator tooth labelled 6 is oriented with south (S) radially inwards. This is due to the one coil in the pair being driven in boost mode while the other coil in the pair is being driven in buck mode. As a result of the magnetic fields induced in the stator teeth 108 labelled 3 and 6, a magnetic force attracts the nearest rotor tooth 106 to each of those two stator teeth, as shown by the arrows in FIG. 6a.

As a result of those forces, the stator teeth are attracted towards alignment with stator teeth 108 labelled 3 and 6, as shown in FIG. 6b. In order to cause further rotation of the rotor, the pair of stator coils 110 mounted to the stator teeth 108 labelled 2 and 5 are then energised. This sets up magnetic fields in the respective stator coils 110, as illustrated in FIG. 6b. As a result of the magnetic fields induced in the stator teeth 108 labelled 2 and 5, a magnetic force attracts the nearest rotor tooth 106 to each of those two stator teeth, as shown by the arrows in FIG. 6b.

As a result of those forces, the stator teeth are attracted towards alignment with stator teeth 108 labelled 2 and 5, as shown in FIG. 6c. In order to cause further rotation of the rotor, the pair of stator coils 110 mounted to the stator teeth 108 labelled 1 and 4 are then energised. This sets up magnetic fields in the respective stator coils 110, as illustrated in FIG. 6c. As a result of the magnetic fields induced in the stator teeth 108 labelled 1 and 4, a magnetic force attracts the nearest rotor tooth 106 to each of those two stator teeth, as shown by the arrows in FIG. 6c. As a result of those forces, the stator teeth are attracted towards alignment with stator teeth 108 labelled 1 and 4.

This moves the rotor 102 into a position equivalent to the one depicted in FIG. 6a, albeit with each of the rotor teeth 106 shifted anticlockwise by one position. Hence, this pattern of energisation of the stator coils 110 can be repeated for continued rotation of the rotor 102. Similarly, the same pattern of energisation can be repeated across the other groups of stator coils 110 in the electric motor system.

While, in FIGS. 6a, 6b and 6c, the magnetic fields induced in the stator teeth 108 are shown with a specific polarity (i.e. north-south orientation), this can be arranged differently. For example, the choice of which stator coil 110 to power with boost or buck operation may be reversed from the arrangement shown in any of FIG. 6a, 6b or 6c. In some embodiments, the winding direction may be reversed on some of the stator coils 110, thereby allowing the same magnetic polarity to be generated by both coils in a pair, one generated using buck operation and one generated using boost operation. In some embodiments, the polarity of each magnetic field may be further varied from iteration to iteration of the energisation sequence. For example, after each sequence, the polarity of each of the magnetic fields may be reversed for the next sequence.

Figure 7A:
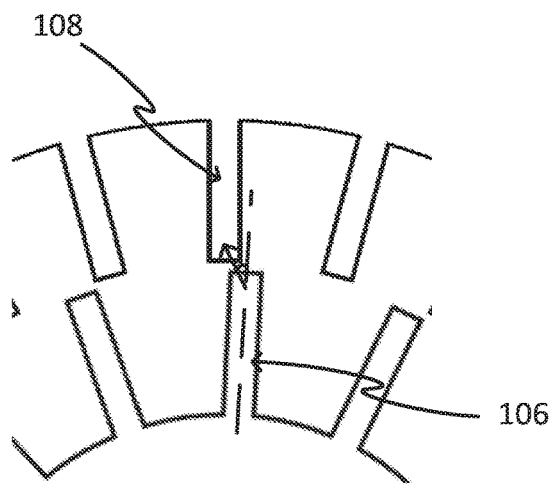
FIGS. 7a, 7b and 7c illustrate the resultant force on a rotor tooth for stator coil energisation at different stages of a tooth arc.
Figure 7B:
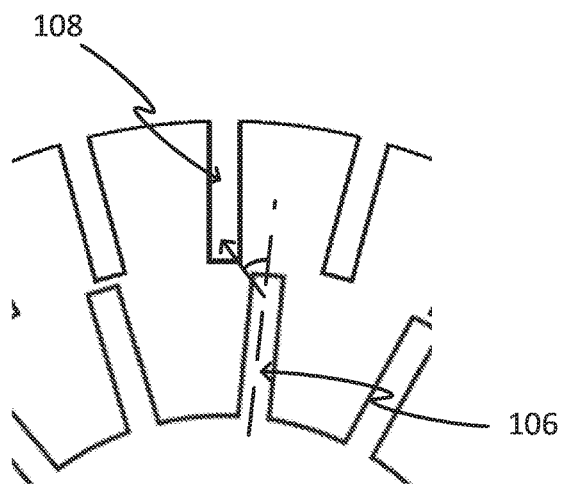
Figure 7C:
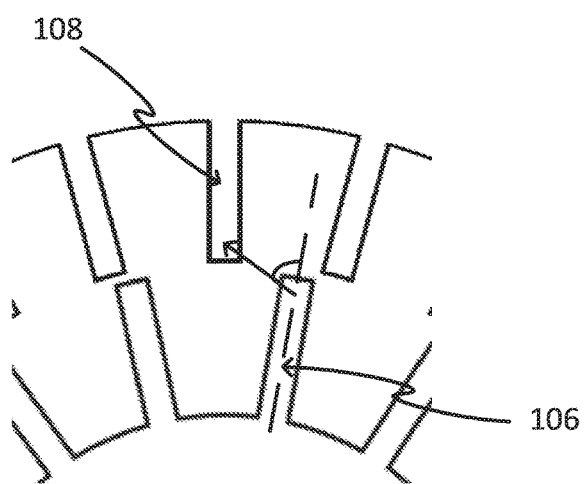

FIGS. 7a to 7c illustrate the resultant force on a rotor tooth 106 for stator coil energisation at different stages of a tooth arc. A tooth arc comprises the range of positions that a rotor tooth 106 may occupy as it passes from alignment with one stator tooth 110 to the next. During operation of the electric motor 100, a rotor tooth 106 will traverse the tooth arc during a given time period, which is proportional to the speed of the rotor 102. At a point in the tooth arc, the stator coil 110 is energised in order to attract a rotor tooth 106 into alignment with the corresponding stator tooth over the time period.

In a conventional electric motor system, a stator coil 110 is energised when the corresponding stator tooth 108 at least partially overlaps with the nearest rotor tooth 106, as depicted in FIG. 7a. Such an overlap may be considered a coaxial overlap between the rotor tooth 106 and stator tooth 108. However, as can be seen from the force arrow in FIG. 7a, the majority component of the resulting attractive force in this scenario is radial with respect to the electric motor. Conventional electric motors operate in this region because, during overlap, the inductance of the stator coil 110 is significantly higher. Depending on the implementation this difference could be in the region of two to four times larger when fully aligned compared to no overlap, for example. This higher inductance proportionally reduces the amount of current that the power supply is required to deliver. Hence, in a conventional electric motor, energising each stator coil only during overlap ensures that a high power density is achieved in attracting the rotor tooth.

Utilising the properties of the electric motor system described herein, it is possible to adjust the timing of the energisation of the stator coil 110 during the period of the tooth arc to achieve certain characteristics. By energising the stator coil 110 during an earlier period of the tooth arc, as shown in FIG. 7b, it can be seen that the radial component of the resulting attractive force between the rotor tooth 106 and the stator tooth 108 is reduced. Such operation is avoided in conventional electric motor systems as operating outside of overlap significantly reduces the inductance of the stator coil, which would therefore place a much larger peak power demand on the power supply and significantly reduce the power density at the supply. However, the balanced pairings of driver circuit portions 200 and the energy recycling properties described above makes advancing the timing of stator coil energisation practicable; the necessary higher current supplied at the stator coil 110 to enable non-overlapping operation does not require proportionately higher current from the supply, as the peaks are cancelled out. In other words, the lower power density at the coil does not translate to a lower power density at the supply. Using this technique to reduce the radial torque may also reduce the audible noise generated by the electric motor system 100 during operation, as a larger component of the force is provided in the intended direction of motion of the rotor tooth 106.

Therefore, according to some embodiments, the timing of the energisation of at least one of the stator coils 110 in the electric motor system 100 is configured to occur before the stator tooth 108 overlaps the corresponding rotor tooth 106. By advancing the timing of the stator coil energisation in this manner, in some embodiments, the energisation of that stator coil 110 may both start and finish before the stator tooth 108 overlaps the corresponding rotor tooth 106. In other words, in such embodiments, the stator coil 110 is not energised during a portion of the given time period when the stator tooth 108 at least partially overlaps the corresponding rotor tooth 106.

In some embodiments, this advanced timing operation may be repeated in subsequent time periods to further improve certain characteristics of the electric motor system. For example, in a subsequent time period, another stator coil 110 may be energised during a portion of that time period before the corresponding stator tooth 108 overlaps the corresponding rotor tooth 106. In some such embodiments, all of the stator coils 110 are energised at a point in their respective tooth arcs before the corresponding stator tooth 108 overlaps the corresponding rotor tooth 106.

As can be seen from FIG. 7c, the stator coil 110 may be energised at a point in the tooth arc that is yet earlier in the time period. At this point in the tooth arc, as can be seen from the force arrow in FIG. 7c, the radial component of the resultant force is yet further reduced. In this scenario, the reactive component of the applied power is further increased, further reducing power density. However it can be seen that there are several positions during the tooth arc at which a stator coil 110 may be energised which are made practicable by embodiments.

In some arrangements, different stator coils 110 in the electric motor system 100 may be energised at different relative times during the time period. In this manner, the peak load that is experienced by the power supply of the electric motor system 100 may be reduced, as it is somewhat spread over the time period. In some embodiments, the energisation of one stator coil 110 which occurs relatively early during the time period does not overlap with the energisation of a second stator coil 110 which occurs relatively late during the time period. In other words, in such embodiments, the portion of the time period for which the two stator coils 110 are energised is non-overlapping. In some embodiments, the energisation of the stator coil 110 which occurs relatively late during the time period may take place at a point in the tooth arc at which the stator tooth 108 overlaps with the corresponding rotor tooth 106. In alternative embodiments, the energisation of the stator coil 110 which occurs relatively late during the time period may take place at a point in the tooth arc at which the stator tooth 108 does not overlap with the corresponding rotor tooth 106.

Whereas, above, the timing operation has been described in relation to a single stator coil 110, in practice, due to the rotational symmetries in the rotor 102 and stator 104 (described previously) these techniques may also be applied to subsets of stator coils 110 which number greater than one. This allows the control circuitry 114 to control the stator coils 110 in groups, thereby allowing the control circuitry 114 to be simplified somewhat. In some embodiments, where an overlap is described between a stator tooth 108 and a rotor tooth 106, this may include an overlap between the rotor tooth 106 and the stator coil 110 of the corresponding stator tooth 108. In alternative embodiments, the overlap only relates to an overlap between the rotor tooth 106 and the stator tooth 108 itself, and does not include an overlap with the corresponding stator coil 110.

In some embodiments, there may be provided computer software which is configured to cause the control circuitry to control the electric motor according to the aforementioned methods. Such computer software may be provided in the form of a computer program product, comprising a non-transitory storage medium.

What is claimed is:

1. An electric motor comprising:
   a stator comprising a plurality of stator teeth, each stator tooth having a stator coil mounted thereto;
   a rotor comprising a plurality of rotor teeth, the rotor being arranged to rotate relative to said stator during operation of the electric motor such that one or more of the rotor teeth periodically overlap with one or more of the stator teeth;
   control circuitry to energise the stator coils of a subset of the stator teeth during a given time period to attract a rotor tooth into alignment with each of the stator teeth in the subset over the given time period, wherein the control circuitry is configured to commence energization of a stator coil of at least one stator tooth in the subset during a portion of the given time period prior to the at least one stator tooth completely overlapping a corresponding rotor tooth; and driver circuitry to generate pulse signals to energize said stator coils, wherein the driver circuitry comprises boost generation circuitry to energize the stator coil of the at least one stator tooth during the given time period, buck circuitry to energize the stator coil of the at least one stator tooth during a time period subsequent to the given time period, and a storage capacitor to charge responsive to energy applied to the stator coil of the at least one stator tooth during the given time period and discharge into the stator coil of the at least one stator tooth during the time period subsequent to the given time period.

2. The electric motor according to claim 1, wherein the stator coil of the at least one stator tooth is not energised during a portion of the given time period when the at least one stator tooth at least partially overlaps the corresponding rotor teeth.

3. The electric motor according to claim 1, wherein the control circuitry is configured to further energise the stator coils of a second, different, subset of the stator teeth during a second time period, wherein the control circuitry is configured to energise a stator coil of at least one stator tooth in the second subset during a portion of the second time period before the stator teeth in the second subset overlap corresponding rotor teeth.

4. The electric motor according to claim 1, wherein the control circuitry is configured to energise the stator coils of the plurality of stator teeth during a period of rotation of the rotor before the corresponding rotor teeth overlap with each respective stator tooth in the plurality of stator teeth.

5. The electric motor according to claim 1, wherein the control circuitry is configured to energise stator coils of at least two of the stator teeth in the subset at different points during the given time period.

6. The electric motor according to claim 5, wherein the control circuitry is configured to energise the stator coils of the at least two stator teeth for non-overlapping portions of the given time period.

7. The electric motor according to claim 5, wherein the control circuitry is configured to energise the stator coils of the at least two stator teeth during the portion of the given time period before the stator teeth in the subset overlap the corresponding rotor teeth.

8. The electric motor according to claim 5, wherein the control circuitry is configured to energise the stator coil of at the least one of the stator teeth in the subset during a portion of the given time period when the stator teeth in the subset at least partially overlap the corresponding rotor teeth.

9. The electric motor according to claim 1, wherein the stator teeth in the subset are equally spaced circumferentially about the stator.

10. The electric motor according to claim 9, wherein the stator teeth in the first subset are arranged to each overlap a corresponding rotor tooth at substantially the same time during rotation of the rotor.

11. The electric motor according to claim 1, wherein the rotor tooth corresponding to a given stator tooth comprises a rotor tooth among the plurality of rotor teeth which is nearest to the given stator tooth at a given point in time during rotation of the rotor.

12. Circuitry for an electric motor comprising:
driver circuitry to selectively energise stator coils of a stator having a plurality of stator teeth, each stator tooth having one of said stator coils mounted thereon; and
control circuitry to cause the driver circuitry to energise stator coils of a subset of the stator teeth during a given time period to attract a corresponding rotor tooth into alignment with each of the stator teeth in the subset over the given time period, wherein the control circuitry is configured to trigger the driver circuitry to commence energization of the stator coil of at least one stator tooth in the subset during a portion of the given time period prior to the at least one stator tooth completely overlapping the corresponding rotor tooth, and wherein the driver circuitry comprises boost generation circuitry to energize the at least one stator coil during the given time period, buck circuitry to energize the at least one stator coil during a time period subsequent to the given time period, and a storage capacitor to charge responsive to energy applied to the at least one stator coil during the given time period and discharge into the at least one stator coil during the time period subsequent to the given time period.

13. A method of operating an electric motor, comprising:
selectively energising the coils of a stator having a plurality of stator teeth, each stator tooth having one of said coils mounted thereon, the selectively energising comprising: energising the stator coils of a subset of the stator teeth during a given time period to attract a corresponding rotor tooth into alignment with a stator tooth in the subset over the given time period, wherein energization of the stator coil of at least one stator tooth in the subset commences during a portion of the given time period prior to the at least one stator tooth completely overlapping the corresponding rotor tooth;
charging a storage capacitor responsive to energy applied to the stator coil of the at least one stator tooth during the given time period; and
discharging the storage capacitor into the stator coil of the at least one stator tooth during a time period subsequent to the given time period to energize the stator coil of the at least one stator tooth.

14. The method according to claim 13, wherein the stator coil of the at least one stator tooth is not energised during a portion of the given time period when the at least one stator tooth at least partially overlaps the corresponding rotor teeth.

15. The method according to claim 13, wherein the stator teeth in the subset are equally spaced circumferentially about the stator, and wherein the stator teeth in the first subset are arranged to each overlap a corresponding rotor tooth at substantially the same time during rotation of the rotor.

16. The circuitry for the electric motor according to claim 12, wherein the control circuitry is further configured to energise the stator coils of the plurality of stator teeth during a period of the rotation of the rotor before the corresponding rotor teeth overlap with each respective stator tooth in the plurality of stator teeth.

17. The circuitry for the electric motor according to claim 12, wherein the control circuitry is further configured to energise the stator coils of at least two of the stator teeth in the subset of the stator teeth at different points in time during the given time period.

18. The circuitry of the electric motor according to claim 17, wherein the control circuitry is configured to energise the stator coil of the at least one stator tooth in the subset of the stator teeth during a portion of the given time period when the stator teeth in the subset of the stator teeth at least partially overlap the corresponding rotor teeth.

* * * * *